Patented Dec. 29, 1931

1,838,270

UNITED STATES PATENT OFFICE

LEOPOLD LASKA AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE

AZO DYESTUFFS FROM 2.3-HYDROXYNAPHTHOIC ACID ARYLIDS AND PROCESS OF MAKING THE SAME

No Drawing. Application filed May 24, 1926, Serial No. 111,372, and in Germany May 23, 1925.

The present invention relates to new azo dyestuffs from 2.3-hydroxy-naphthoic acid arylids and a process of preparing the same. We have found that valuable novel azo dyestuffs are obtained if 2.3-hydroxynaphthoic acid arylids are allowed to couple with the diazo compounds obtained from amines of the general type:

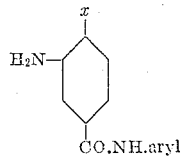

wherein $x$ represents a halogen atom or an alkyl group.

The most probable graphical representation for our novel dyestuffs is the formula:

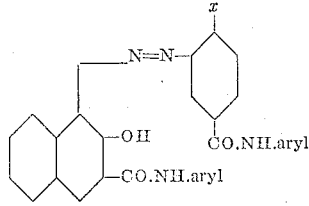

wherein $x$ represents a halogen atom or an alkyl group. These coloring matters are in the dry state reddish to dark colored powders, which dissolve in concentrated sulfuric acid with from blue to dark violet colors. By reduction the original amines of the aforesaid types are recovered together with 1-amino-2-hydroxynaphthalene-3-carboxylic acid arylids.

The new dyestuffs may be produced either as such or on a base, i. e., on a substratum or on the vegetable fibre. Mixed with or precipitated on substrates these novel dyestuffs produce valuable color lakes. They are furthermore of great interest in the dyeing of vegetable fibres. The dyestuff is in this case directly produced on the fibre, the dyeings obtained are of exceedingly clear shades and particularly fast to kier boiling.

The amines of the aforesaid type may be prepared by causing arylcarboxylic acid chlorides further substituted in the before described manner besides by a nitro-group to react on primary or secondary amines, which may contain further substituents in an aryl residue, and by reducing the nitrocompounds thus obtained, or they may be obtained by reaction of a condensing agent, such as phosphorous trichloride, on a mixture of a nitroarylcarboxylic acid substituted as above described with an eventually substituted primary or secondary aminobase, advantageously in a diluent or solvent, and by a subsequent reduction.

The following examples will further illustrate our novel process and the products obtained by it. We wish it however to be understood that we are not limited to the particular conditions nor to the specific products mentioned therein. The parts are by weight.

Example 1

7.8 parts of 3'-amino-4'-methylbenzoyl-2-chloro-aniline are thoroughly stirred up with 14 parts of hydrochloric acid (spec. grav. 1.160), 50 parts of water and ice are added, and then diazotized with a solution of 2.1 parts of sodium nitrite in 10 parts of water. To this solution a solution of 8.1 parts of 2.3-hydroxynaphthoylanaline in 8.4 parts of caustic soda (36° Bé.), 1 part of Turkey red oil, 3.7 parts of crystal sodium acetate in 150 parts of water is run in. The coupling is finished after several hours stirring. The dyestuff is thus obtained in the form of a brilliant red paste. When mixed with the usual substrates it forms valuable bluish red lakes. After drying it dissolves in concentrated sulfuric acid with a bluish wine red color and has most probably the formula:

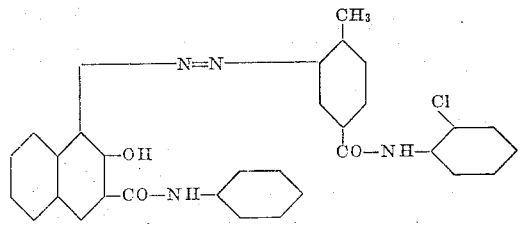

Example 2

Well boiled out and dried yarn is impregnated with a solution containing per liter 3 gr. of 2.3-hydroxynaphthoyl-β-naphthylamine, 9 cc. of caustic soda (34° Bé.) and 8 cc. of Turkey red oil. It is then well wrung and without drying developed with a solution, containing per liter the diazo compound of 4.7 gr. of 4'-chloro-3-amino-benzoylaniline which has been neutralized with calcium carbonate. After rinsing, soaping and drying the yarn is dyed a yellowish red shade of a very good fastness to kier boiling. The dyestuff precipitated on the fibre has most probably the formula:

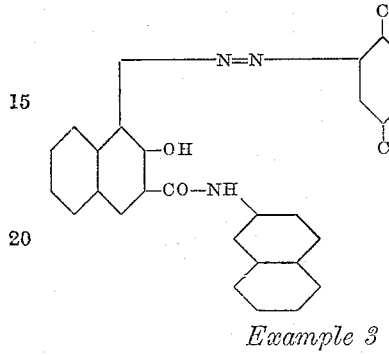

*Example 3*

10 gr. of 2.3-hydroxynaphthoyl-4-chloro-2-anisidine are dissolved with 15 cc. of caustic soda (34° Bé.), 8 cc. of Turkey red oil and a sufficient quantity of water to make 1 liter, and in this solution well boiled out and dried yarn is padded in the usual manner. By developing then in a dyeing bath, neutralized with calcium carbonate and containing a diazo solution of 4.7 gr. of 4'-chloro-3'-amino-benzoylaniline in the liter, a dyestuff is obtained having probably the formula:

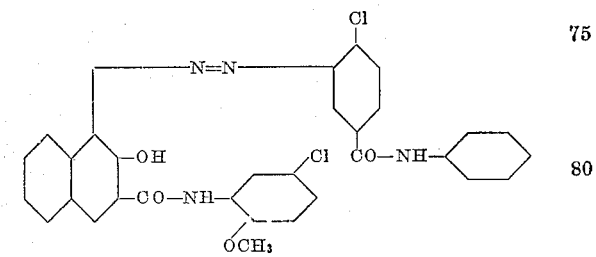

In this manner a yellowish red shade of a very good fastness to kier boiling is obtained.

The same shades and fastness properties are obtained by producing the dyestuffs on the fibre by the usual printing processes.

The following table gives the shades obtained on cotton material by using other of our novel azo combinations:

| Diazo compound of: | Combined with 2.3-hydroxynaphthoyl: | Shades: |
|---|---|---|
| 3'-amino-4'-methyl-benzoyl-3-toluidine of the formula: $CH_3-\langle NH_2 \rangle-CO-NH-\langle CH_3 \rangle$ | | |
| Do. | 2-toluidine | Fiery scarlet red |
| Do. | 3-anisidine | Bluish red |
| Do. | 2-phenetidine | Yellowish red |
| Do. | α-naphthylamine | Bluish red |
| Do. | β-naphthylamine | Fiery scarlet |
| 3'-amino-4'methyl-benzoyl-2-chloroaniline of the formula: $CH_3-\langle NH_2 \rangle-CO-NH-\langle Cl \rangle$ | | |
| Do. | 2-chloroaniline | Fiery scarlet |
| Do. | 2-anisidine | Clear scarlet red |
| Do. | α-naphthylamine | Clear bluish red |
| Do. | β-naphthylamine | Fiery scarlet |
| 3'-amino-4'-methyl-benzoyl-4-chloro-2-toluidine of the formula: $CH_3-\langle NH_2 \rangle-CO-NH-\langle CH_3, Cl \rangle$ | | |
| Do. | 2-chloroaniline | Fiery scarlet red |
| Do. | 3-toluidine | Fiery scarlet |
| Do. | 4-toluidine | Fiery scarlet |
| Do. | α-naphthylamine | Bluish red |
| Do. | β-naphthylamine | Clear red |
| Do. (Two molecular proportions) | Bis-(2.3-hydroxynaphthoyl)-dianisidine of the formula: | Garnet brown |
| 3' amino-4'-methylbenzoyl-2.5-dichloroaniline of the formula: $CH_3-\langle NH_2 \rangle-CO-NH-\langle Cl, Cl \rangle$ | Aniline | Yellowish red |
| Do. | 4-anisidine | Yellowish red |
| Do. | α-naphthylamine | Dark red |

| Diazo compound of: | Combined with 2.3-hydroxynaphthoyl: | Shades: |
|---|---|---|
| 3'-amino-4'-methylbenzoyl-2-anisidine of the formula: $CH_3-\langle\rangle-CO-NH-\langle\rangle-OCH_3$ with $NH_2$ | 3-chloroaniline | Clear bluish scarlet |
| Do. | 3-nitraniline | Bluish red |
| Do. | 2-anisidine | Fiery scarlet red |
| Do. | β-naphthylamine | Fiery scarlet red |
| 3'-amino-4'-methylbenzoyl-5-chloro-2-anisidine of the formula: $CH_3-\langle\rangle-CO-NH-\langle\rangle-Cl$ with $NH_2$, $OCH_3$ | 3-anisidine | Scarlet red |
| Do. | 4-chloro-2-anisidine | Fiery scarlet |
| Do. | 5-chloro-2-anisidine | Fiery scarlet |
| Do. | 2-aminohydroquinone-dimethylether | Orange brown |
| Do. | α-naphthylamine | Dark bluish red |
| Do. | β-naphthylamine | Clear scarlet red |
| Do. (Two molecular proportions) | Bis-(2.3-hydroxynaphthoyl) dianisidine | Garnet brown |
| 3'-amino-4'-methylbenzoyl-4-phenetidine of the formula: $CH_3-\langle\rangle-CO-NH-\langle\rangle-OC_2H_5$ with $NH_2$ | 2-toluidine | Fiery scarlet |
| Do. | 2-anisidine | Clear bluish red |
| Do. | 4-chloro-2-anisidine | Fiery scarlet red |
| Do. | 2-phenetidine | Clear yellowish red |
| Do. | β-naphthylamine | Fiery scarlet |
| 3'-amino-4'-methylbenzoyl-aminohydroquinone-dimethylether of the formula: $CH_3-\langle\rangle-CO-NH-\langle\rangle$ with $NH_2$, $OCH_3$, $OCH_3$ | α-naphthylamine | Clear red |
| Do. (Two molecular proportions) | Bis-(2.3-hydroxynaphthoyl)-dianisidine | Garnet brown |
| 3'-amino-4'-methylbenzoyl-2-aminophenylether of the formula: $CH_3-\langle\rangle-CO-NH-\langle\rangle$ with $NH_2$, $OC_6H_5$ | 2.3-hydroxynaphthoyl: β-naphthylamine | Clear scarlet red |
| 3'-amino-4'-methylbenzoyl-α-naphthylamine of the formula: $CH_3-\langle\rangle-CO-NH-\langle\rangle\langle\rangle$ with $NH_2$ | Aniline | Clear red |
| Do. | 2-toluidine | Clear red |
| Do. | 3-nitraniline | Clear bluish red |
| Do. | 2-anisidine | Clear yellowish red |
| Do. | 2-phenetidine | Clear red |
| Do. | 2-aminohydroquinone-dimethylether of the formula: $\langle\rangle\langle\rangle-CO-NH-\langle\rangle$ with $OH$, $OCH_3$, $OCH_3$ | Red |
| Do. | α-naphthylamine | Clear bluish red |
| 3'-amino-4'-methylbenzoyl-β-naphthylamine of the formula: $CH_3-\langle\rangle-CO-NH-\langle\rangle\langle\rangle$ with $NH_2$ | 4-chloroaniline | Clear red |
| Do. | 5-chloro-2-toluidine | Clear red |
| Do. | 3-anisidine | Clear red |
| Do. | 4-anisidine | Fiery scarlet red |
| Do. | 4-chloro-2-anisidine | Clear red |
| Do. | 3-phenetidine | Clear red |
| Do. | 4-phenetidine | Clear red |

| Diazo compound of: | Combined with 2.3-hydroxynaphthol: | Shades: |
|---|---|---|
| Bis-(3'-amino-4'-methylbenzoyl)-dianisidine of the formula: 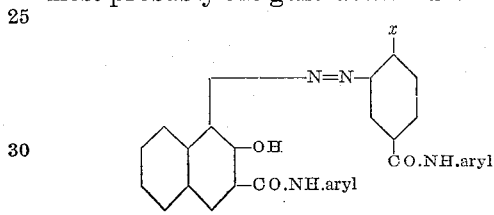 | Combined with two molecular proportions of: 2.3-hydroxynaphthoyl: 4-anisidine | Copper brown |
| Do. | β-naphthylamine | Copper red |
| Bis-(3'-amino-4'-methylbenzoyl)-ortho-tolidine of the formula: 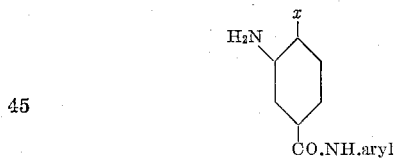 | 5-chloro-2-toluidine | Red |
| Do. | 2-phenetidine | Yellowish red |
| Do. | α-naphthylamine | Bluish red |
| Do. | β-naphthylamine | Yellowish red |

We claim:

1. As new products azo dyestuffs having most probably the general formula:

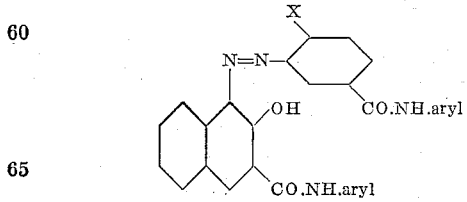

wherein $x$ represents a halogen atom or an alkyl group and "aryl" represents a residue of the benzene or naphthalene series, which dyestuffs are in the dry state reddish to dark colored powders, soluble in concentrated sulfuric acid with from blue to dark violet colors and which by reduction yield an amine of the type

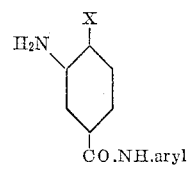

wherein $x$ represents a halogen atom or an alkyl group and "aryl" represents a residue of the benzene or naphthalene series, and a 1-amino-2-hydroxynaphthalene-3-carboxylic acid arylid, and which when produced on vegetable fibres produce reddish shades of an excellent fastness to kier boiling.

2. Vegetable fibres dyed with the dyestuffs of claim 1.

3. As new products, the azo dyestuffs of the probable general formula:

wherein X represents a chlorine atom or a methyl group and "aryl" represents a residue of the benzene or naphthalene series, which dyestuffs are in the dry state reddish to dark colored powders, soluble in concentrated sulfuric acid with from blue to dark violet colors, and which by reduction yield an amine of the type wherein X stands for a chlorine atom or a methyl group and "aryl" represents a residue of the benzene or naphthalene series, and an 1-amino-2-hydroxynaphthalene-3-carboxylic acid arylide, and which when produced on vegetable fibers produce reddish shades of an excellent fastness to kier boiling.

4. Vegetable fibers dyed with the dyestuffs as claimed in claim 3.

5. As new products, the azo dyestuffs of the probable general formula:

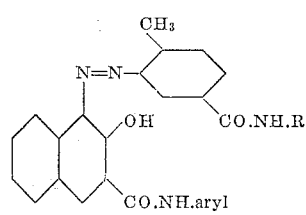

wherein R stands for a residue of the benzene series and "aryl" represents a residue of the benzene or naphthalene series, which dyestuffs are in the dry state reddish to dark colored powders, soluble in concentrated sulfuric acid with from blue to dark violet colors, and which by reduction yield an amine of the type:

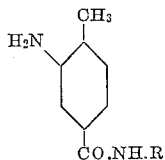

wherein R stands for a residue of the benzene series, and a 1-amino-2-hydroxynaphthalene-3-carboxylic acid arylide, and which when produced on vegetable fibers produce reddish shades of an excellent fastness to kier boiling.

6. Vegetable fibers dyed with the dyestuffs as claimed in claim 5.

7. As new products, the dyestuffs of the probable general formula:

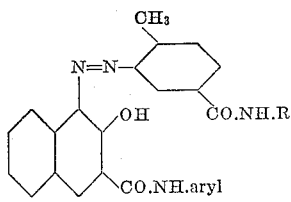
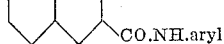

wherein R stands for a phenyl residue containing one or two substituents selected from the group consisting of Cl, CH$_3$, —OCH$_3$ and —OC$_2$H$_5$, and "aryl" represents a residue of the benzene or naphthalene series, which dyestuffs are in the dry state reddish to dark colored powders, soluble in concentrated sulfuric acid with from blue to dark violet colors, and which by reduction yield an amine of the type:

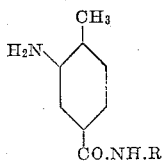

wherein R stands for phenyl residue containing one or two substituents selected from the group consisting of Cl, CH$_3$,—OCH$_3$ and —OC$_2$H$_5$, and a 1-amino-2-hydroxynaphthalene-3-carboxylic acid arylide, and which when produced on vegetable fibers produce reddish shades of an excellent fastness to kier boiling.

8. Vegetable fibers dyed with the dyestuffs as claimed in claim 7.

9. As a new product, the dyestuff of the probable formula:

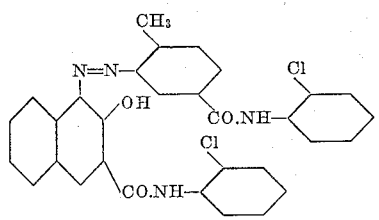

which dyestuff is in the dry state a reddish powder, soluble in concentrated sulfuric acid with a red-violet color, and which by reduction yields an amine of the formula:

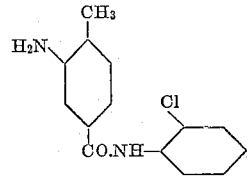

and 1-amino-2.3-hydroxynaphthoyl-ortho-chloroaniline, and which when produced on vegetable fibers produces fiery scarlet shades of an excellent fastness to kier boiling.

10. Vegetable fibers dyed with the dyestuff as claimed in claim 9.

11. As a new product, the dyestuff of the probable formula:

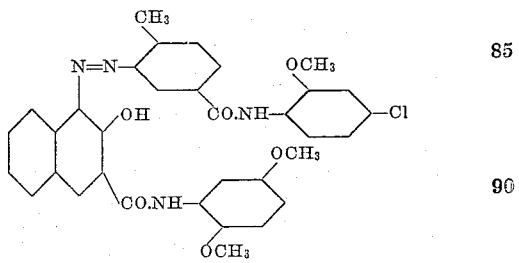

which dyestuff is in the dry state a dark colored powder, soluble in concentrated sulfuric acid with a red-violet color, and which by reduction yields an amine of the formula:

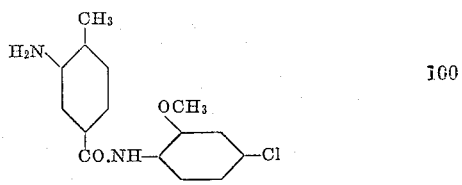

and 1-amino-2.3-hydroxynaphthoyl-2-amino-hydroquinone-dimethylether, and which when produced on vegetable fibers produces orange-brown shades of an excellent fastness to kier boiling.

12. Vegetable fibers dyed with the dyestuff as claimed in claim 11.

In testimony whereof, we affix our signatures.

LEOPOLD LASKA.
ARTHUR ZITSCHER.